(12) United States Patent
Robitaille et al.

(10) Patent No.: US 9,735,874 B2
(45) Date of Patent: Aug. 15, 2017

(54) PROGRAMMABLE SMALL FORM-FACTOR PLUGGABLE MODULE

(75) Inventors: Claude Robitaille, St-Placide (CA); Patrick Ostiguy, Lachine (CA)

(73) Assignee: Accedian Networks Inc., Saint-Laurent (CA)

( * ) Notice: Subject to any disclaimer, the term of this patent is extended or adjusted under 35 U.S.C. 154(b) by 368 days.

(21) Appl. No.: 13/551,804

(22) Filed: Jul. 18, 2012

(65) Prior Publication Data

US 2014/0024255 A1    Jan. 23, 2014

(51) Int. Cl.
*H04B 10/00* (2013.01)
*H04B 10/40* (2013.01)

(52) U.S. Cl.
CPC .................... *H04B 10/40* (2013.01)

(58) Field of Classification Search
CPC ............ H04B 10/40; H03C 3/00; G02B 6/00
See application file for complete search history.

(56) References Cited

U.S. PATENT DOCUMENTS

| | | | |
|---|---|---|---|
| 6,166,688 A | 12/2000 | Cromer et al. | |
| 6,367,037 B1 | 4/2002 | Remer et al. | |
| 6,865,602 B1 | 3/2005 | Nijemcevic et al. | |
| 6,987,743 B2 | 1/2006 | Chen et al. | |
| 7,039,688 B2 | 5/2006 | Matsuda | |
| 7,225,243 B1 | 5/2007 | Wilson | |
| 7,570,657 B1 * | 8/2009 | Lo ...................... | H04L 49/3054 370/465 |
| 7,773,629 B1 * | 8/2010 | Dropps .................. | H04L 49/25 370/389 |
| 7,778,162 B2 | 8/2010 | Yu | |
| 7,787,455 B2 | 8/2010 | Cherchali et al. | |
| 7,912,075 B1 | 3/2011 | Holland et al. | |
| 8,023,465 B2 | 9/2011 | Prehofer | |
| 8,098,671 B1 | 1/2012 | Deruijter et al. | |
| 8,233,437 B2 | 7/2012 | Tazaki | |

(Continued)

FOREIGN PATENT DOCUMENTS

| | | |
|---|---|---|
| EP | 2421200 | 2/2012 |
| KR | 20090004239 | 1/2009 |

(Continued)

OTHER PUBLICATIONS

Devic et al; Secure protcol implementation for remote bitstream update preventing replay attacks on FPGA; 2010, IEEE; pp. 179-182.*

(Continued)

*Primary Examiner* — Ken N Vanderpuye
*Assistant Examiner* — Amritbir Sandhu
(74) *Attorney, Agent, or Firm* — Nixon Peabody LLP

(57) ABSTRACT

A small form factor pluggable ("SFP") transceiver for use in a communications network includes a transmitter adapted to be coupled to the network for supplying signals to the network, a receiver adapted to be coupled to the network for receiving signals from the network, and a programmable signal processing module coupled to the transmitter and the receiver and adapted to be programmed from a remote station coupled to the network. The module can be programmed to perform at least one service or management function on the network.

21 Claims, 6 Drawing Sheets

(56) References Cited

U.S. PATENT DOCUMENTS

| | | | |
|---|---|---|---|
| 8,509,072 B2 | 8/2013 | Lee et al. | |
| 8,571,029 B1 | 10/2013 | Aggarwal et al. | |
| 8,660,617 B1* | 2/2014 | Banerjea | H04W 52/0229 |
| | | | 455/412.2 |
| 8,666,258 B2* | 3/2014 | Ice | G02B 6/4201 |
| | | | 398/138 |
| 8,687,966 B2* | 4/2014 | Hosking | H04B 10/2503 |
| | | | 398/1 |
| 8,949,382 B2* | 2/2015 | Cornett | H04L 41/0806 |
| | | | 709/220 |
| 2003/0053421 A1 | 3/2003 | Yoshimura | |
| 2003/0056008 A1 | 3/2003 | Russell et al. | |
| 2003/0225864 A1 | 12/2003 | Gardiner et al. | |
| 2003/0229809 A1 | 12/2003 | Wexler et al. | |
| 2004/0054937 A1* | 3/2004 | Williams | G06F 1/26 |
| | | | 713/300 |
| 2004/0068330 A1* | 4/2004 | White | G05B 19/0426 |
| | | | 700/18 |
| 2004/0249906 A1 | 12/2004 | Olbricht et al. | |
| 2005/0281256 A1 | 12/2005 | Taipale et al. | |
| 2006/0239183 A1* | 10/2006 | Robitaille | G06F 1/266 |
| | | | 370/217 |
| 2006/0274671 A1 | 12/2006 | Budampati et al. | |
| 2007/0019598 A1 | 1/2007 | Prehofer | |
| 2007/0153091 A1* | 7/2007 | Watlington | H04N 7/15 |
| | | | 348/208.14 |
| 2008/0077425 A1* | 3/2008 | Johnson | G06Q 10/103 |
| | | | 705/301 |
| 2008/0080577 A1* | 4/2008 | Nguyen | H04B 10/40 |
| | | | 372/38.02 |
| 2008/0140815 A1 | 6/2008 | Brant et al. | |
| 2008/0177507 A1* | 7/2008 | Mian | G06F 15/7867 |
| | | | 702/189 |
| 2008/0247762 A1* | 10/2008 | Yoshikawa | G02B 6/4246 |
| | | | 398/138 |
| 2009/0047026 A1* | 2/2009 | Luo | H04B 10/40 |
| | | | 398/135 |
| 2009/0067848 A1* | 3/2009 | Ekkizogloy | H04B 10/40 |
| | | | 398/135 |
| 2009/0073300 A1* | 3/2009 | Chung | H04N 5/23241 |
| | | | 348/333.01 |
| 2009/0085806 A1 | 4/2009 | Piersol et al. | |
| 2009/0103926 A1* | 4/2009 | Hotchkiss | H04L 1/0057 |
| | | | 398/135 |
| 2009/0226138 A1* | 9/2009 | Kelly | G02B 6/4204 |
| | | | 385/89 |
| 2009/0251867 A1* | 10/2009 | Sharma | H04Q 1/08 |
| | | | 361/737 |
| 2009/0292978 A1* | 11/2009 | Miyama | G06F 11/1008 |
| | | | 714/807 |
| 2009/0317073 A1* | 12/2009 | Hotchkiss | H04J 3/1652 |
| | | | 398/1 |
| 2010/0027050 A1* | 2/2010 | Regnier | H04N 1/00204 |
| | | | 358/1.15 |
| 2010/0054154 A1 | 3/2010 | Lambert et al. | |
| 2010/0124418 A1* | 5/2010 | Noble | H04B 10/40 |
| | | | 398/9 |
| 2010/0202781 A1* | 8/2010 | Hudgins | G02B 6/4246 |
| | | | 398/135 |
| 2010/0274917 A1 | 10/2010 | Cherchali et al. | |
| 2010/0280858 A1* | 11/2010 | Bugenhagen | H04L 43/00 |
| | | | 705/50 |
| 2011/0154072 A1* | 6/2011 | Ho | G06F 1/3203 |
| | | | 713/320 |
| 2011/0249408 A1* | 10/2011 | Lavoie | H03G 3/3042 |
| | | | 361/728 |
| 2011/0283140 A1 | 11/2011 | Stevens et al. | |
| 2011/0305150 A1 | 12/2011 | Haver et al. | |
| 2012/0014383 A1 | 1/2012 | Geromel et al. | |
| 2012/0105877 A1 | 5/2012 | Wakamatsu | |
| 2012/0230186 A1 | 9/2012 | Lee et al. | |
| 2012/0257558 A1* | 10/2012 | Shin | H04W 52/0229 |
| | | | 370/311 |
| 2012/0301134 A1* | 11/2012 | Davari | H04L 41/5038 |
| | | | 398/9 |
| 2012/0320751 A1 | 12/2012 | Zhu | |
| 2012/0327768 A1* | 12/2012 | Sarwar | H04L 47/2408 |
| | | | 370/230.1 |
| 2013/0077968 A1* | 3/2013 | Yang | H04B 10/40 |
| | | | 398/45 |
| 2013/0124706 A1* | 5/2013 | Margalit | H04L 12/6418 |
| | | | 709/223 |
| 2013/0148977 A1* | 6/2013 | Shah | H04B 10/40 |
| | | | 398/135 |
| 2013/0195396 A1* | 8/2013 | Julien | H04B 10/25 |
| | | | 385/14 |
| 2013/0223484 A1* | 8/2013 | Tang | H04B 10/40 |
| | | | 375/219 |
| 2013/0243438 A1* | 9/2013 | Tang | H04B 10/40 |
| | | | 398/135 |
| 2013/0243439 A1* | 9/2013 | Ito | H04B 10/40 |
| | | | 398/135 |
| 2013/0251052 A1* | 9/2013 | Tang | H04L 25/03878 |
| | | | 375/259 |
| 2013/0315582 A1* | 11/2013 | Kawanishi | H04B 10/07 |
| | | | 398/17 |
| 2013/0346591 A1 | 12/2013 | Carroll et al. | |
| 2014/0024255 A1* | 1/2014 | Robitaille | H04B 10/40 |
| | | | 439/607.2 |
| 2014/0056592 A1* | 2/2014 | McColloch | H04B 10/40 |
| | | | 398/135 |
| 2014/0056593 A1* | 2/2014 | DeAndrea | H04B 10/291 |
| | | | 398/135 |
| 2014/0056594 A1* | 2/2014 | Ding | H04J 14/0282 |
| | | | 398/136 |
| 2014/0064721 A1* | 3/2014 | Wang | H04B 10/2503 |
| | | | 398/5 |
| 2014/0071855 A1* | 3/2014 | Robitaille | H04L 5/1438 |
| | | | 370/255 |
| 2014/0079403 A1* | 3/2014 | Daghighian | H05K 1/0283 |
| | | | 398/115 |
| 2014/0169785 A1* | 6/2014 | Roullot | H04B 10/40 |
| | | | 398/25 |
| 2014/0363171 A1* | 12/2014 | Tang | H04B 10/40 |
| | | | 398/135 |
| 2014/0369214 A1* | 12/2014 | Jinsong | H04L 43/50 |
| | | | 370/252 |
| 2015/0125158 A1* | 5/2015 | El-Ahmadi | H04L 7/0075 |
| | | | 398/135 |
| 2015/0188635 A1* | 7/2015 | Yeh | H04B 10/40 |
| | | | 398/135 |
| 2015/0188636 A1* | 7/2015 | Su | H04B 10/40 |
| | | | 398/135 |
| 2015/0200726 A1* | 7/2015 | Tang | H04B 10/40 |
| | | | 398/25 |
| 2015/0249503 A1* | 9/2015 | Sone | G02B 6/4246 |
| | | | 398/135 |
| 2015/0256259 A1* | 9/2015 | Huang | G01J 1/0271 |
| | | | 398/88 |
| 2015/0256260 A1* | 9/2015 | Kurashima | G02B 6/4277 |
| | | | 398/135 |
| 2016/0380698 A1* | 12/2016 | Elahmadi | H04B 10/40 |
| | | | 398/135 |
| 2017/0059796 A1* | 3/2017 | Huang | G02B 6/4251 |

FOREIGN PATENT DOCUMENTS

| | | | |
|---|---|---|---|
| WO | 2010097514 | † | 9/2010 |
| WO | 2011/054006 | | 5/2011 |

OTHER PUBLICATIONS

Drimer et al; A protocol for secure Remote updates of a FPGA configurations; 2009; springer; pp. 50-61.*

Cheshire, et al. "Dynamic Configuration of IPv4 Link-Local Addresses," May 2005, 33 pages.

(56) References Cited

OTHER PUBLICATIONS

Plummer, "An Ethernet Address Resolution Protocol—or—Converting Network Protocol Addresses to 48.bit Ethernet Address for Transmission on Ethernet Hardware," Nov. 1982, 10 pages.
Malkin, "Traceroute Using an IP Option," Jan. 1993, 7 pages.
https://lkml.org/lkml/2005/10/19/46 on Oct. 16, 2012, Ingo Molnar, Oct. 19, 2005, 7 pages.
Sosnoski, "Classworking toolkit: Combining source and bytecode generation," Oct. 4, 2005, 9 pages.
Cyclone IV Device Handbook, vol. 1, Altera, Dec. 2010 (478 pages).
IEEE Standard for Information Technology, Part 3: Carrier Sense Multiple Access with Collision Detection (CSMA/CD) access method and Physical Layer specifications, 2008 (315 pages).
Gigabit Ethernet Auto-Negotiation, by Rich Hernandez, www.dell.com/powersolutions, 1999 (6 pages).
Thomas, G. "Incorporating Media Converters." Contemporary Control Systems, Inc. the Extension. vol. 7, No. 6, Nov. 2006 [online] [retrieved on Dec. 4, 2013]. Retrieved from the Internet: <URL: http://www.ccontrols.com/pdf/Extv7n6.pdf> (4 pages).
Avago Technologies. "1000BASE-T Interface and Functionality of ABCU-57xxRZ Gigabit Ethernet Small Form Puggable Electrical Transceivers Over Category 5 Unshielded Twisted Pair Cable—Application Note 5286." XP055091424, Sep. 14, 2010 [online] [retrieved on Dec. 4, 2013]. Retrieved from the Internet <URL: http://www.avagotech.com/docs/AV02-2643EN‎> (16 pages).
International Search Report and Written Opinion mailed Nov. 26, 2013 which issued in International Patent Application No. PCT/IB2013/001559 (8 pages).
International Search Report and Written Opinion mailed Dec. 4, 2013 which issued in International Patent Application No. PCT/IB2013/001557 (9 pages).
International Search Report and Written Opinion mailed Dec. 9, 2013 which issued in International Patent Application No. PCT/IB2013/001556 (7 pages).
Extended European Search Report mailed Dec. 18, 2013 which issued in European Patent Application No. 13183360.0 (11 pages).
Rad Data Communications, Rad & Miniature & SFP-S & SFF 8439 Specifications, Dec. 2007.†
Rad Data Communications, Data Sheet—MIRICi-155 Intelligent Miniature Gbe over STM-1/OC-3 NTU, 2007-2010.†
Drimer and Kuhn, A Protocol for Secure Remote Updates of FPGA Configurations, pp. 50-61, 2009, Lecture Notes in Computer Science vol. 5453.†

\* cited by examiner
† cited by third party

PROGRAMMABLE SMALL FORM-FACTOR PLUGGABLE MODULE

CROSS-REFERENCE TO RELATED APPLICATIONS

This application incorporates by reference in their entireties the following applications, all of which have the same filing date as the present application: U.S. application Ser. No. 13/551,998, "Systems and Methods of Detecting and Assigning IP Addresses to Devices with ARP Requests," by Robitaille and Lemieux; U.S. application Ser. No. 13/552,022, "Systems and Methods of Using Beacon Messages to Discover Devices Across Subnets," by Robitaille and Bouffard; U.S. application Ser. No. 13/552,063, "Systems and Methods of Discovering and Controlling devices without Explicit Addressing," by Robitaille and Bouffard, and U.S. application Ser. No. 13/551,984, "Systems and Methods of Installing and Operating Devices without Explicit Network Addresses," by Robitaille and Lemieux.

FIELD OF THE INVENTION

This invention is directed towards the use of an SFP for the purpose of offering Service OAM functions. For ease of deployment, the SFP can operate without any previous knowledge of the network where it is deployed and the behaviour of the SFP and the services it can offer can be managed in a centralized manner or distributed manner.

BACKGROUND OF THE INVENTION

An SFP is a compact, hot-pluggable transceiver used for both telecommunication and data communications applications. It generally interfaces a network device mother board (for a switch, router, media converter or similar device) to a fiber optic or copper networking cable. SFP transceivers are designed to support SONET, Gigabit Ethernet, Fibre Channel, and other communications standards. The following description is based on an optical SFP, but it should be understood to cover any type of SFPs.

SUMMARY OF THE INVENTION

In accordance with one embodiment, a small form factor pluggable ("SFP") transceiver for use in a communications network includes a transmitter adapted to be coupled to the network for supplying signals to the network, a receiver adapted to be coupled to the network for receiving signals from the network, and a programmable signal processing module coupled to the transmitter and the receiver and adapted to be programmed from a remote station coupled to the network, the module being programmable to perform at least one service and management functions on the network. The programmable signal processing module may be a field programmable gate array or an application specific integrated circuit.

In specific implementations, the programmable signal processing module is programmable to perform at least one service assurance function on the network. such as monitoring network traffic and diagnosing issues (e.g., performing remote in-service Layer 1-4 loopback, ITU-T Y.1564 and RFC-2544 performance testing), and/or monitoring actual customer statistics from a web browser or portable test set. The programmable signal processing module may also be programmable to perform service management functions on the network, such as policing, traffic shaping and VLAN mapping.

The programmable signal processing module may be programmed to listen to traffic on the network, to detect a predetermined message broadcast by a remote device coupled to the network, and to respond to the predetermined message to indicate that the module is coupled to the network and is functioning. Communications with the remote device may be without the use of IP protocols over an ISO Layer 2 network.

BRIEF DESCRIPTION OF THE DRAWINGS

The invention may best be understood by reference to the following description taken in conjunction with the accompanying drawings.

DETAILED DESCRIPTION OF ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
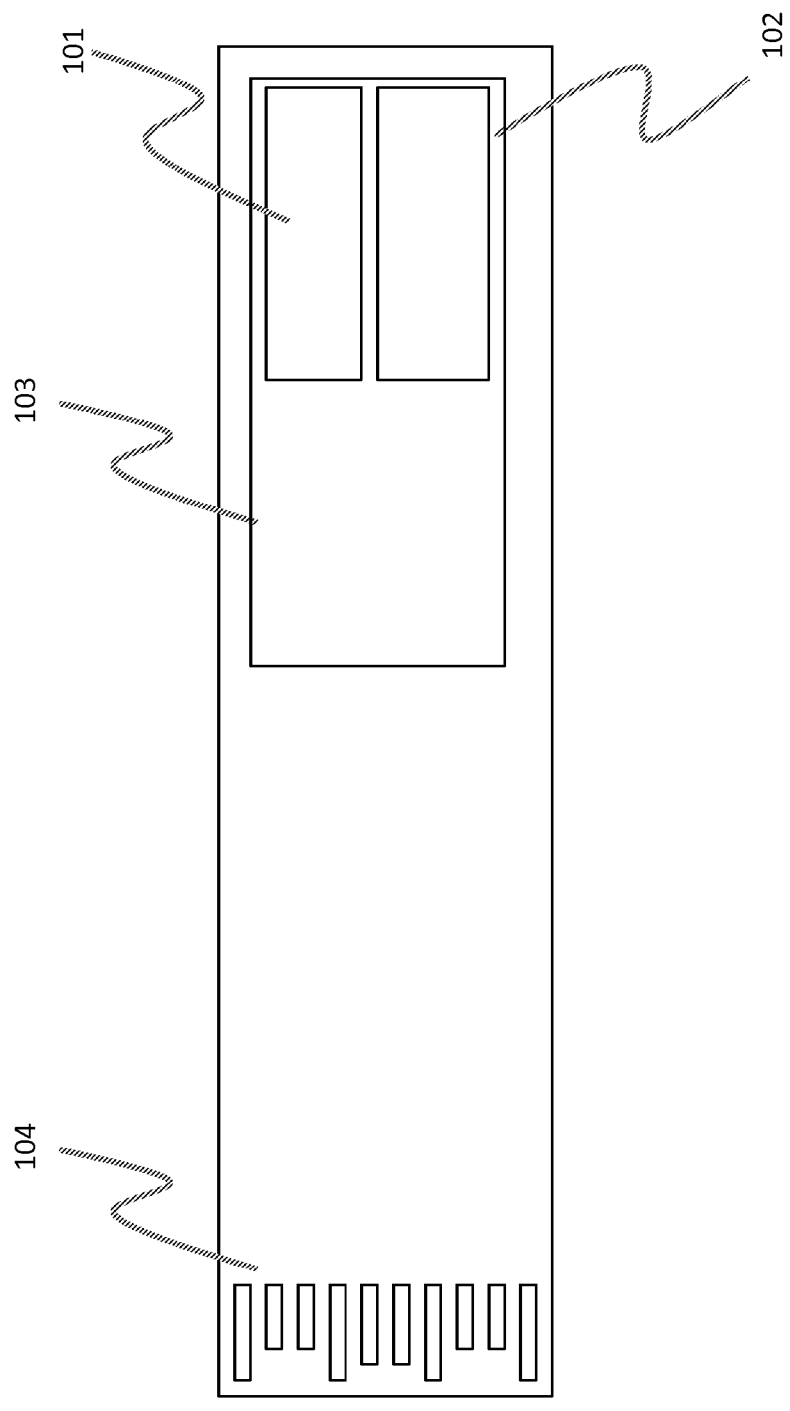
FIG. 1 is a diagrammatic illustration of an SFP optical transceiver.

Turning now to the drawings and referring first to FIG. 1, an SFP optical transceiver module 100 houses an optical transmitter 101 and an optical receiver 102, as per FIG. 1. The optical transmitter 101 generally comprises components for generating an optical signal (e.g., a light source, such as a light-emitting diode (LED) or laser diode) and one or more optics elements for directing the light into the end of a transmit optical fiber. The optical receiver 102 generally comprises the components for receiving an optical signal (e.g., a photodetector or photosensor) and one or more optics elements for directing light output from the end of a receive optical fiber onto the photodetector or photosensor. The optics elements of the transmitter and receiver of the module are part of an optics assembly 103 that couples to a duplex receptacle. There is also an electrical interface 104 that includes connections to provide power, ground and signals to the SFP. Although these modules have some rudimentary monitoring capability (e.g., I2C) that are generally limited to the physical characteristics such as power, they are by nature limited to the local physical link. These modules do not have the diagnostic capabilities that are required to identify and isolate network issues, such as delay or loss spanning the entire or a portion of the network.

Figure 2:
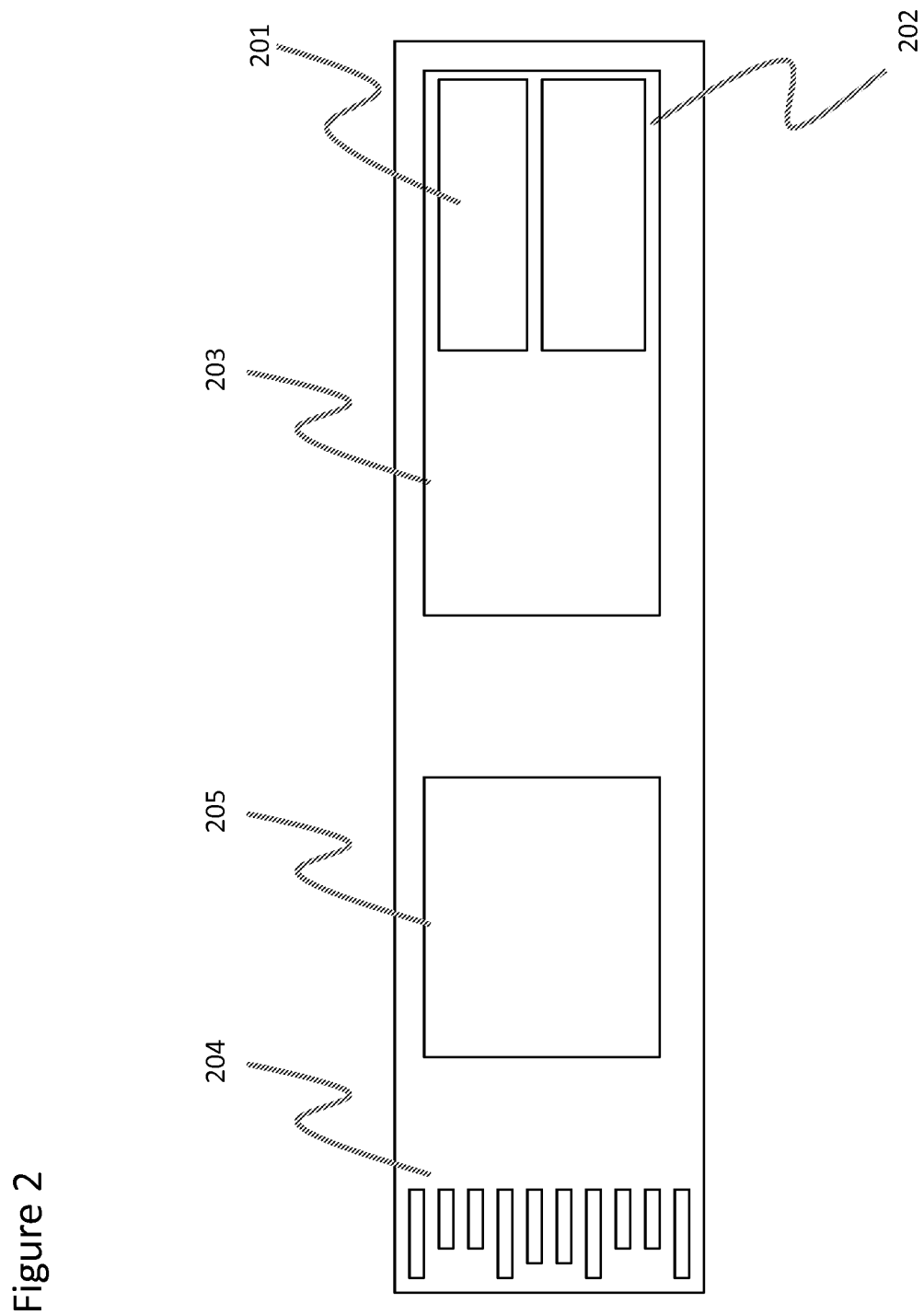
FIG. 2 is a diagrammatic illustration of an SFP optical transceiver that includes an inline programmable module such as a FPGA.
Figure 3:
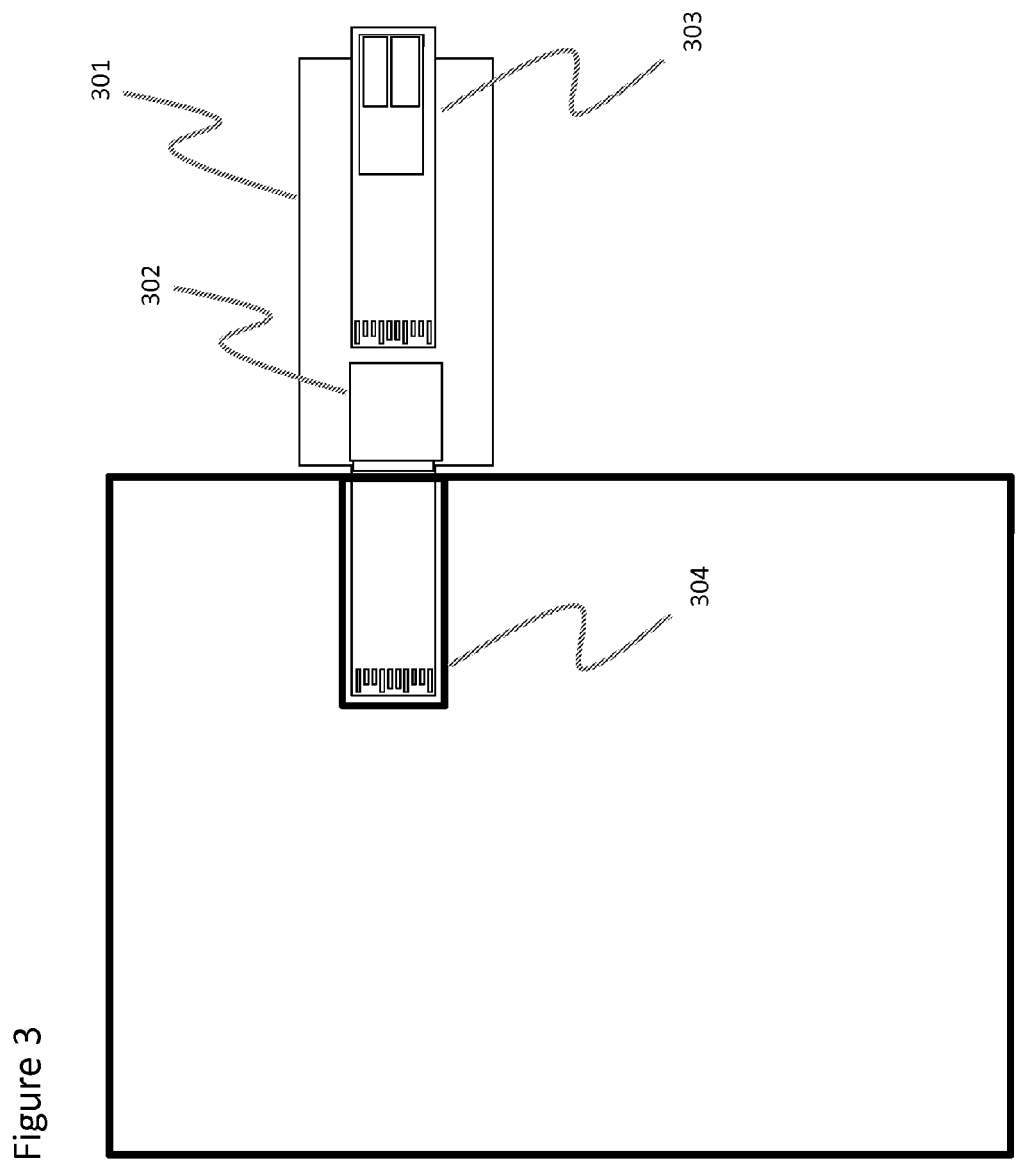
FIG. 3 is a diagrammatic illustration of an adapter device that includes an SFP optical transceiver that further includes an inline programmable module such as a FPGA.

FIG. 2 illustrates an optical SFP transceiver module 200 that is the same as the module 100 with the addition of a Field Programmable Gate Array (FPGA) 205. The FPGA can be added to the SFP housing, either inline as depicted in FIG. 2, or as an adaptor device. FIG. 3 depicts an where the adaptor device 301 that contains an FPGA 302 and an SFP 303 and plugs into a port 304.

Additional power and a power converter may be added to the SFP to feed the FPGA. The FPGA may initially contain some programming, but can also be configured and/or re-programmed from a remote station or node without requiring changes to the software on the network node where the SFP with the FPGA resides. The FPGA can also be operated remotely from a remote station or node. The FPGA may be replaced with other programmable modules such as ASIC-based solutions.

Since the objective is to manage the FPGA remotely without having to modify the software or firmware on the node it resides, there is a need for discovering that the SFP housing an FPGA has been connected on the network.

In one embodiment, the FPGA on the SFP is programmed to perform service assurance functions on the network, such as monitoring network traffic and diagnosing issues, performing remote, in-service Layer 1-4 loopback, ITU-T Y.1564 and RFC-2544 performance testing, 1-way delay and jitter measurements, and monitoring actual customer statistics from a web-browser or portable test set without the need of any other test equipment, loopback testing, service management and demarcation. The FPGA can also be programmed to perform service management functions such as policing, traffic shaping, VLAN mapping etc.

If power consumption on the SFP is an issue, the unit can be configured with a subset of the functionality that complies with the power limitations. The set of features can be reprogrammed remotely on an as-needed basis without affecting the node or taking the port out of service. For example, using different FPGA loads, the on-board storage can support multiple such loads. Loads with lesser functions can run at lower clock speed and therefore consume less power, or they may simply have less logic active at a time. Other techniques for increasing the efficiency of a load that are known in the art can also be applied.

The FPGA can be configured remotely while the port is active. After proper identification of the remote programming node, to prevent security breach, the FPGA collects and assembles configuration packets into binary files, checks the integrity of the files, and then reprograms itself.

Figure 4:
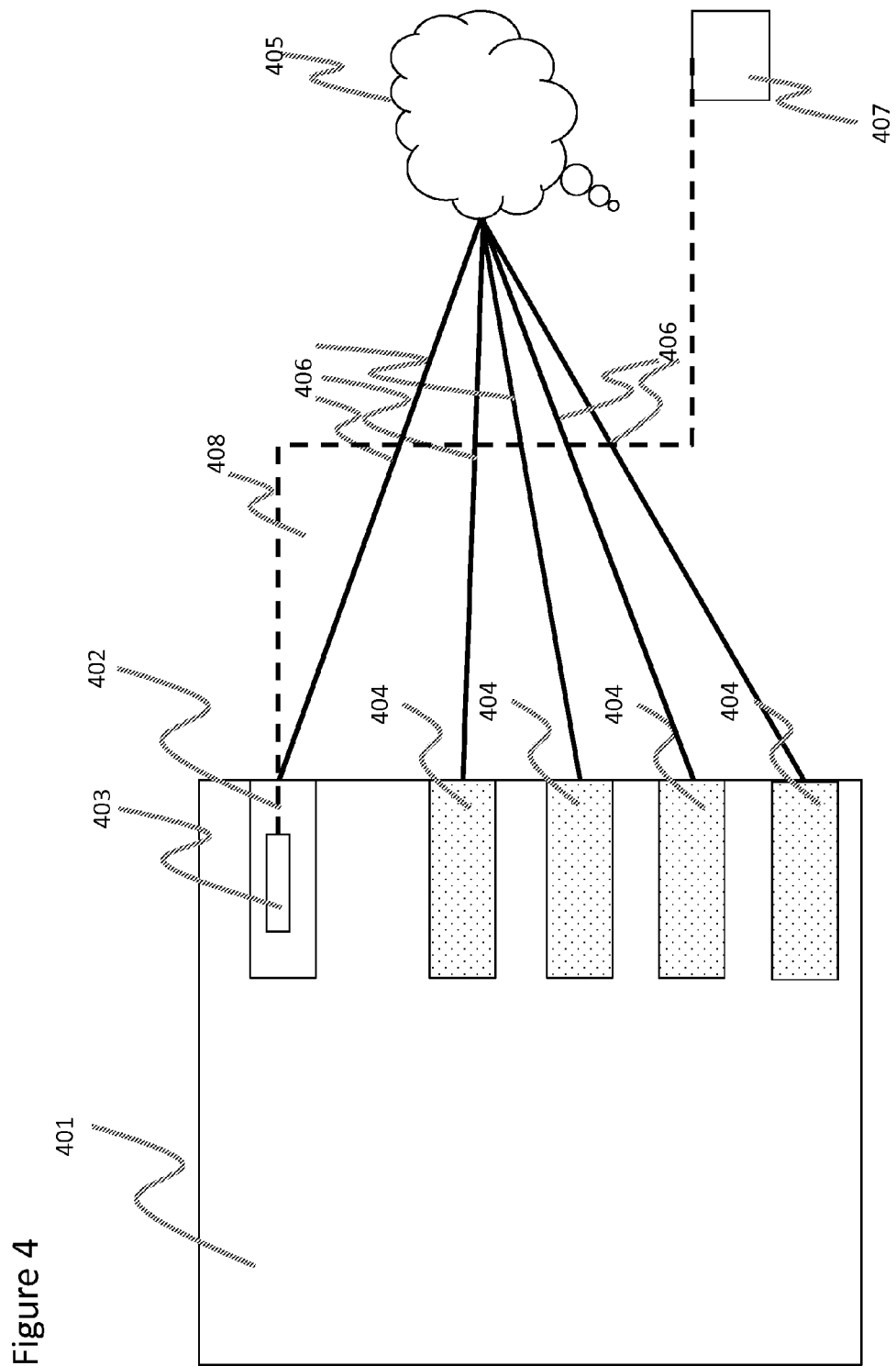
FIG. 4 is a diagrammatic illustration of a system in which an SFP optical transceiver located at a network node with an FPGA that is programmed from a remote node.

FIG. 4 illustrates an embodiment in which a node 401 is configured with several standard SFP ports 404 and one SFP port 402 with a programmable FPGA 403. All the ports 402 and 404 are connected to one or more networks 405 using a respective link 406. The FPGA 403 is discovered and configured and optionally programmed remotely by a node 407 using a control path 408.

Figure 5:
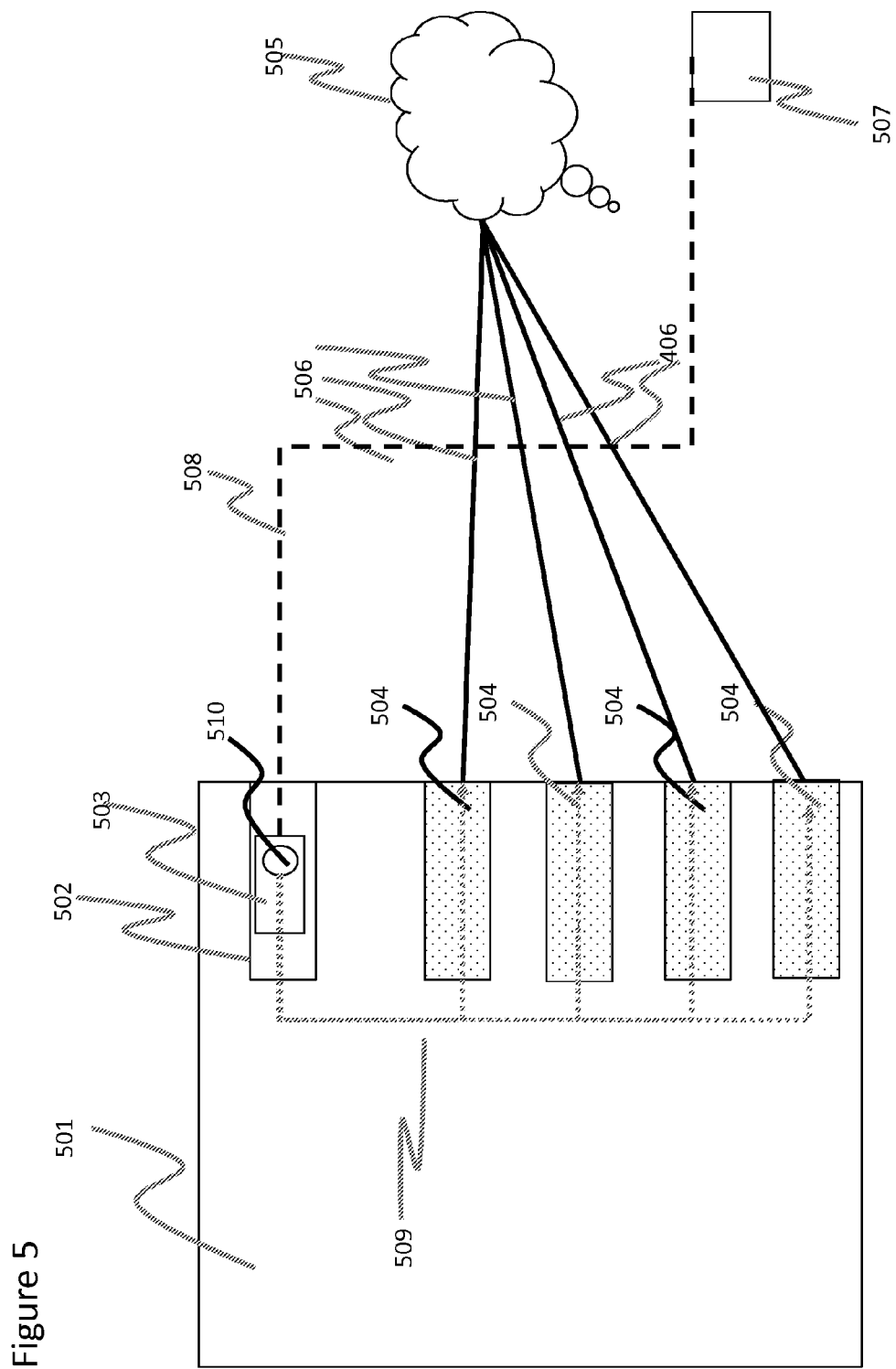
FIG. 5 is a diagrammatic illustration of a system similar to that of FIG. 4 in which the FPGA is configured as an embedded traffic generator.

FIG. 5 illustrates an embodiment in which a node 501 is configured with several standard SFP ports 504 and one SFP port 502 with a programmable FPGA 503. All the ports 502, 504 are connected to one or more networks 505 using a respective link 506. The FPGA 503 is discovered and configured and optionally programmed remotely by a node 507 using a control path 508. In this case, the FPGA is configured as an embedded traffic generator 510 to create test packets 509 for insertion in the paths of the standard SFPs 504. In this case, the port hosting the FPGA 502 may be a normal forwarding port, or it could be only used to house a test traffic generator.

Figure 6:
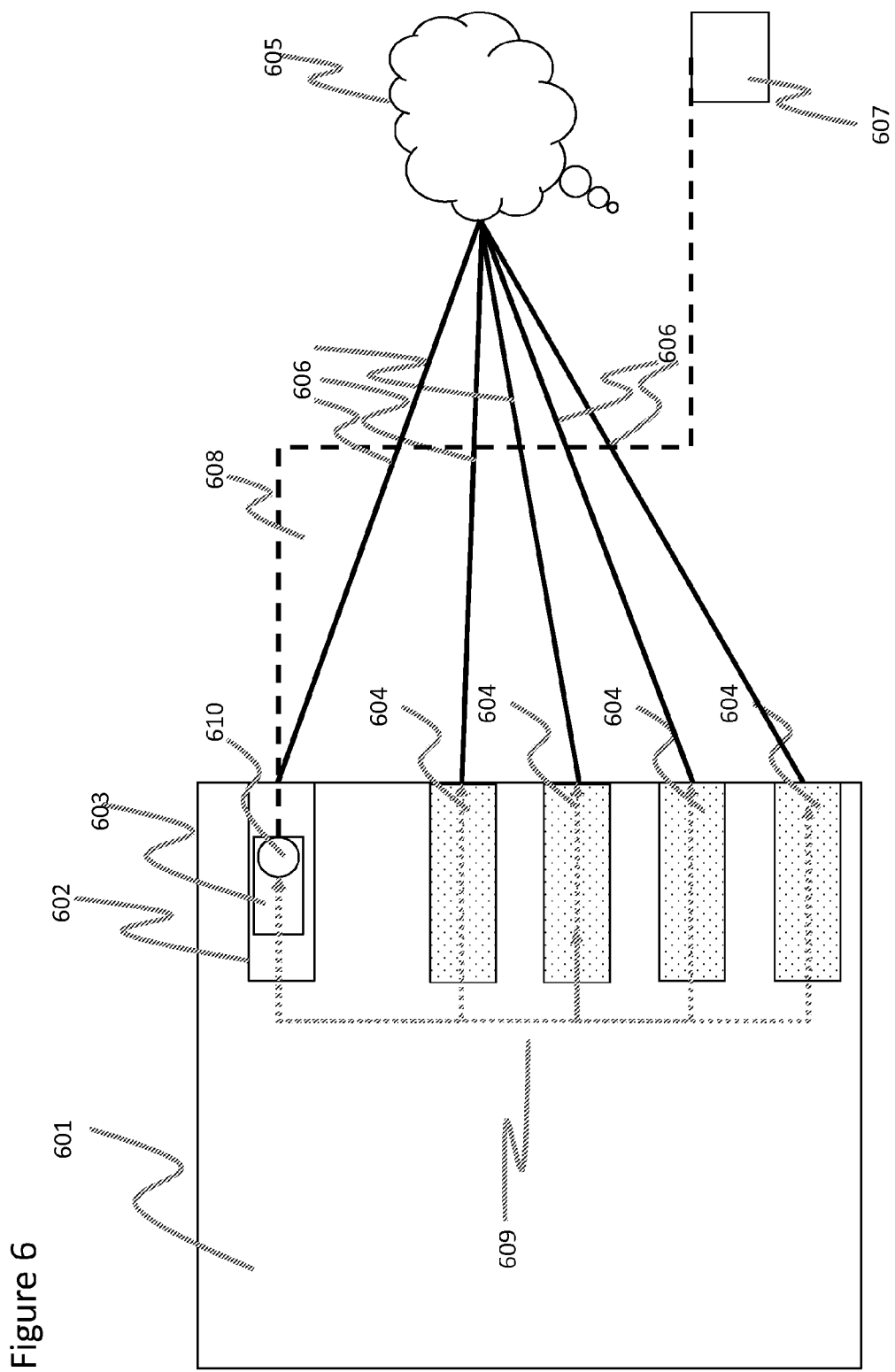
FIG. 6 is a diagrammatic illustration of a system similar to that of FIG. 4 in which the FPGA is configured to perform intelligent loop back.

Referring to FIG. 6, in another embodiment, a node 601 is configured with several standard SFP ports 604 and one SFP port 602 with a programmable FPGA 603. All the ports 602, 604 are connected to one or more networks 605 using a respective link 606. The FPGA 603 is discovered and configured and optionally programmed remotely by a node 607 using a control path 608. In this case, the FPGA is configured to perform intelligent loop back 610 by swapping MAC and IP addresses and returning the packets in the paths 609 of the standard SFPs 604. In this case, the port hosting the FPGA 602 may be a normal forwarding port or it could be only used to house the device providing loop back capability.

The FPGA or other programmable module can be discovered in the network using a discoverer (e.g. testing unit, router, remote node) that is local to the subnet where the programmed module is located. The module to be discovered is programmed to watch for responses of a device located upstream.

The FPGA or other programmable module can be reprogrammed remotely to perform other functions or services. A discoverer can transmit a management packet to the FPGA or other programmable module to request that it loads different firmware or program logic from local permanent storage or from a remote location. This is achieved by virtue of a dual-stage boot method. When the FPGA or other programmable module needs to load new firmware or program logic, it will indicate this in permanent storage (for instance a FLASH memory) and/or special hardware register to guide the primary boot loader where to locate the secondary boot.

The present invention includes systems having processors to provide various functionality to process information, and to determine results based on inputs. Generally, the processing may be achieved with a combination of hardware and software elements. The hardware aspects may include combinations of operatively coupled hardware components including microprocessors, logical circuitry, communication/networking ports, digital filters, memory, or logical circuitry. The processors may be adapted to perform operations specified by a computer-executable code, which may be stored on a computer readable medium.

The steps of the methods described herein may be achieved via an appropriate programmable processing device, such as an external conventional computer or an on-board field programmable gate array (FPGA) or digital signal processor (DSP), that executes software, or stored instructions. In general, physical processors and/or machines employed by embodiments of the present invention for any processing or evaluation may include one or more networked or non-networked general purpose computer systems, microprocessors, field programmable gate arrays (FPGA's), digital signal processors (DSP's), microcontrollers, and the like, programmed according to the teachings of the exemplary embodiments of the present invention, as is appreciated by those skilled in the computer and software arts. Appropriate software can be readily prepared by programmers of ordinary skill based on the teachings of the exemplary embodiments, as is appreciated by those skilled in the software arts. In addition, the devices and subsystems of the exemplary embodiments can be implemented by the preparation of application-specific integrated circuits or by interconnecting an appropriate network of conventional component circuits, as is appreciated by those skilled in the electrical arts. Thus, the exemplary embodiments are not limited to any specific combination of hardware circuitry and/or software.

Stored on any one or on a combination of computer readable media, the exemplary embodiments of the present invention may include software for controlling the devices and subsystems of the exemplary embodiments, for driving the devices and subsystems of the exemplary embodiments, for processing data and signals, for enabling the devices and subsystems of the exemplary embodiments to interact with a human user, and the like. Such software can include, but is not limited to, device drivers, firmware, operating systems, development tools, applications software, and the like. Such computer readable media further can include the computer program product of an embodiment of the present invention for performing all or a portion (if processing is distributed) of the processing performed in implementations. Computer code devices of the exemplary embodiments of the present invention can include any suitable interpretable or executable code mechanism, including but not limited to scripts, interpretable programs, dynamic link libraries (DLLs), Java classes and applets, complete executable programs, and the like. Moreover, parts of the processing of the exemplary embodiments of the present invention can be distributed for better performance, reliability, cost, and the like.

Common forms of computer-readable media may include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

The invention claimed is:

1. A system to perform one or more service assurance and management functionalities in a network comprising:
a small form factor pluggable (SFP) optical transceiver located at a network node, the SFP optical transceiver comprising an optical transmitter and an optical receiver;
a programmable signal processing module coupled with the SFP optical transceiver;
the SFP optical transceiver, the programmable signal processing module, a discoverer and a remote station coupled to the network;
the SFP optical transceiver further comprising a power converter to power the programmable signal processing module;
the discoverer discovering the programmable signal processing module in the network;
the remote station programming the programmable signal processing module, after the programmable signal processing module is discovered without requiring changes to the software on the network node, to perform the one or more service assurance and management functionalities in the network; and
the programmable signal processing module enabling the programming by the remote station by:
collecting and assembling a plurality of configuration packets sent by the remote station into binary files;
checking the integrity of the binary files; and
reprogramming the programmable signal processing module with a subset of the one or more service and assurance functionalities selected based on a configuration of the programmable signal processing module, the configuration selected to require no more than a predetermined power consumption of the SFP optical transceiver and increase load efficiency.

2. The system of claim 1 wherein the one or more service assurance and management functionalities in the network comprises at least one service assurance function.

3. The system of claim 2 in which the at least one service assurance function is selected from the group consisting of
(i) monitoring network traffic and diagnosing network traffic issues,
(ii) performing remote in-service Layer 1-4 loopback,
(iii) ITU-T Y.1564 and RFC-2544 performance testing, and
(iv) monitoring actual customer statistics from a web browser or portable test set.

4. The system of claim 1 further comprising the programmable signal processing module detecting a remotely broadcast predetermined message.

5. The system of claim 4 further comprising the programmable signal processing module responding to the predetermined message to indicate that the programmable signal processing module is coupled to the network and is functioning.

6. The system of claim 1, further comprising the discoverer transmitting a management packet to the programmable signal processing module to request loading of firmware or program logic from
(i) either local permanent storage, or
(ii) a remote location.

7. The system of claim 1, further comprising several standard SFP ports wherein the remote station programs the programmable signal processing module to generate one or more test packets to insert in the paths of the standard SFP ports.

8. The system of claim 1, further comprising several standard SFP ports wherein the remote station programs the programmable signal processing module to perform intelligent loopback by swamping MAC and IP addresses in a set of packets and returning the packets in the paths of the standard SFP ports.

9. The system of claim 1, wherein the discoverer is located within the remote station.

10. The system of claim 1, wherein the programmable signal processing module is located within the SFP optical transceiver.

11. The system of claim 1, wherein the programmable signal processing module is a Field Programmable Gate Array.

12. A method for performing one or more service assurance and management functionalities in a network, the method implemented using a system comprising:
a small form factor pluggable (SFP) optical transceiver located at a network node, the SFP optical transceiver comprising an optical transmitter and an optical receiver and a power converter, and coupled with a programmable signal processing module powered by the power converter and the network, the programmable signal processing module, a discoverer and a remote station coupled to the network;
the method comprising:
discovering, by the discoverer, the programmable signal processing module in the network;
transmitting, by the discoverer, a management packet to the programmable signal processing module to request loading of firmware or program logic;
programming, by the remote station, the programmable signal processing module to perform the one or more service assurance and management functionalities in the network; and
enabling, by the programmable signal processing module, the programming by the remote station by:
collecting and assembling a plurality of configuration packets sent by the remote station into binary files;
checking integrity of the binary files; and
reprogramming the programmable signal processing module to perform a subset of the one or more service assurance and management functionalities selected based on a configuration of the programmable signal processing module, the configuration selected to require no more than a predetermined power consumption of the SFP optical transceiver and increase load efficiency.

13. The method of claim 12, wherein the compliance with one or more power limitations is achieved by reducing clock speed.

14. The method of claim 12, wherein the compliance with one or more power limitations is achieved by reducing logic activity.

15. The method of claim 12, wherein the service and assurance functionalities are selected from the group consisting of:
(i) monitoring network traffic and diagnosing network traffic issues,
(ii) performing remote in-service layer 1-4 loopback,
(iii) ITU-T Y.1564 and RFC-2544 performance testing, and
(iv) monitoring actual customer statistics from a web browser or portable test set.

16. The method of claim 12, wherein the discoverer is located within the remote station.

17. The method of claim 12, further wherein the transmitting comprises the discoverer transmitting the management packet to the programmable signal processing module to request the loading of the firmware or program logic from
(i) either local permanent storage, or
(ii) a remote location.

18. The method of claim 12, wherein the network is an ISO Layer 2 network.

19. The method of claim 18, wherein the remote station communicates with the programmable signal processing module without the use of IP protocols.

20. The method of claim 12, wherein the programmable signal processing module is located within the SFP optical transceiver.

21. The method of claim 12, wherein the programmable signal processing module is a Field Programmable Gate Array.

* * * * *